(12) United States Patent
Lu et al.

(10) Patent No.: US 7,769,714 B2
(45) Date of Patent: Aug. 3, 2010

(54) AUTOMATIC ERROR CORRECTION FOR REPLICATION AND INSTANTANEOUS INSTANTIATION

(75) Inventors: Edwina Lu, Palo Alto, CA (US); Mahesh Subramaniam, Foster City, CA (US); Lik Wong, Union City, CA (US); James Stamos, Saratoga, CA (US); Nimar Singh Arora, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 292 days.

(21) Appl. No.: 11/935,939

(22) Filed: Nov. 6, 2007

(65) Prior Publication Data

US 2009/0119346 A1 May 7, 2009

(51) Int. Cl.
*G06F 17/30* (2006.01)
(52) U.S. Cl. .................................................. 707/610
(58) Field of Classification Search ................. 707/101, 707/201, 203, 610
See application file for complete search history.

(56) References Cited

U.S. PATENT DOCUMENTS 6,192,365 B1 * 2/2001 Draper et al. ............... 707/101
6,999,977 B1 * 2/2006 Norcott et al. .............. 707/203
2008/0005189 A1 * 1/2008 Omura ....................... 707/201

* cited by examiner

Primary Examiner—Etienne P LeRoux
(74) Attorney, Agent, or Firm—Hickman Palermo Truong & Becker LLP

(57) ABSTRACT

An approach is provided to automatically resolve conflict between instantiation and ongoing data replication operations. In an embodiment, incremental change records that describe one or more database operations are received at a sink entity. Here, all of the one or more database operations have occurred in a second database after a particular time. A first database operation in the one or more database operations to a particular row in the first database is applied. When a conflict with a second database operation that operates on the particular row is detected, one or more compensating actions, which may, but are not limited to, be a different database operation and/or an operation that creates a conflict log entry, may be performed. Here, the second database operation has occurred in the second database prior to the particular time. When the second database operation is to be performed, an appropriate operation may be performed.

32 Claims, 6 Drawing Sheets

AUTOMATIC ERROR CORRECTION FOR REPLICATION AND INSTANTANEOUS INSTANTIATION

FIELD OF THE INVENTION

The present invention relates to database systems and, more specifically, database systems that support replication and instantaneous instantiation.

BACKGROUND

Information stored in a database system may be shared with other database systems. For example, data in a database system may be replicated to another database system. Data replication may be done in two stages. In the first stage, a replica database system may be instantiated at a target site. This replica database system may only comprise a part of an overall database system at the target site. At the end of this (instantiation) stage, a copy of data in a database system at a source site that exists at a particular point in time will have been instantiated to the target site. In the second stage, any data, including both incremental changes and new data, that has been added after the particular point in time at the source site may be captured and transferred to the target site.

However, if the incoming rate of incremental changes at the source site is high and the instantiation window is large, then the instantiation may take a long time (i.e. the data to be copied in the first stage may be large). As a result, many incremental changes may be cumulated at the source site during the first stage, waiting to be transferred in the second stage. As a result, even when the first (instantiation) stage is finished, the data replicated only represents a very stale version of data at the source site.

Therefore, a disadvantage is that, if the incoming rate of incremental changes is very high and close to the capacity, then it may take an unacceptable amount of time before the replica site can reach a "steady state" with respect to the source site.

An additional disadvantage is that these techniques often require that newly created tables at the source site be instantiated in the first stage, thereby causing suspension and further delays in the second stage of incremental data change transfers.

Therefore, a better mechanism, which would better support replication and instantiation between databases, is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
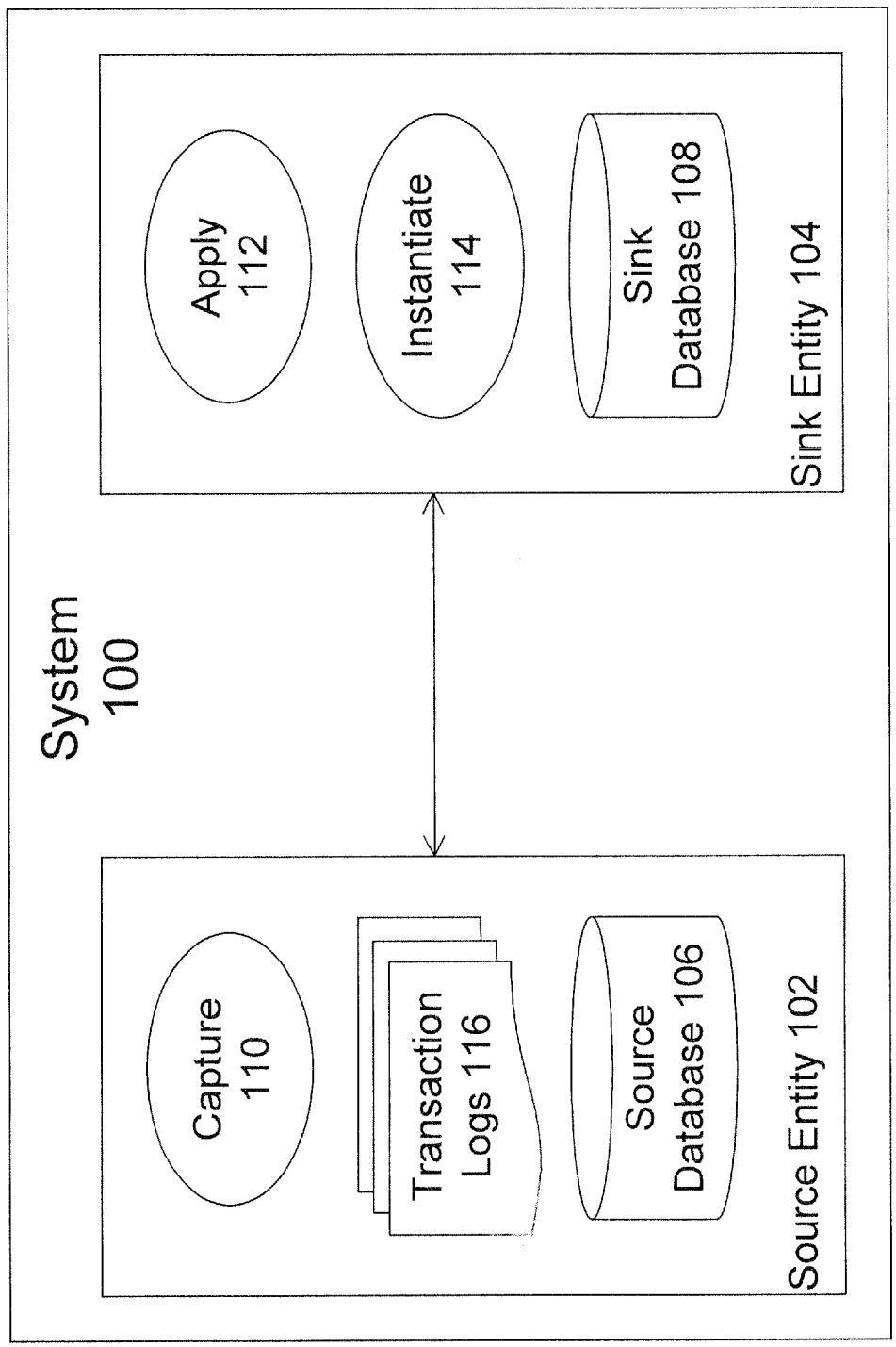
FIG. 1A is a block diagram of an example database system in accordance with an embodiment of the present invention.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Overview

In accordance with an embodiment of the present invention, transferring of data (or, equivalently, data change operations) between a source database and a sink database in a distributed database system may be performed using two types of streams of data ("streams"). The first type is an instantiation stream comprising operations that occur within an instantiation window. The end of the instantiation window, in some embodiments, is marked by a particular time point that corresponds to an instantiation system change number.

The second type of stream is an apply stream comprising operations that occur after the particular time point. As new operations may continuously occur in the source database, the apply stream may be an ongoing process as long as the source database is continuously being changed.

Logically speaking, the operations in the apply stream may causally depend on the operations in the instantiation stream, due to the fact that the former operations occur after the latter operations. Thus, to avoid conflict between operations in these two streams, logically speaking, the apply stream should be used to update the sink database only after the instantiation stream finishes its work of updating the sink database.

In accordance with an embodiment of the present invention, the apply stream and the instantiation stream may run concurrently or at different times, in any order; automatic conflict resolution may be implemented in processes that handle these streams to resolve conflicts arising from causal dependencies between operations from the apply stream and the instantiation stream.

Accordingly, data changes after the instantiation window may be continuously captured and applied at the sink database, even while the sink database is being instantiated. This approach ensures that upon completion of an instantiate process that is responsible for applying database operations in the instantiation stream in the sink database, the sink database will be in a "steady state". In addition, new tables can be added the sink database without suspending the existing streams. For example, to replicate tables, the apply stream does not have to be suspended.

In accordance with an embodiment of the present invention, an apply process that applies operations in the apply stream may take one or more compensating actions when a conflict with another operation (in the instantiation stream) that has not yet been replicated is discovered. The one or more compensating actions also may include applying a data operation that is different from the one that is received in the streams. The one or more compensating actions also may include creation of one or more conflict log entries.

In some embodiments, the instantiation stream may be decomposed into a stream of one or more data definition operations and two component streams: an insert stream and a delete stream. Data manipulation operations such as insert, delete, or update may likewise be decomposed into operations in the insert stream and the delete stream. In these embodiments, the conflict log entries created by the apply process may indicate which type of operation is in conflict, thereby indicating which component stream of the instantiation stream is in conflict with an underlying operation in the apply stream. For example, if an operation in the apply stream is in conflict with an insert operation in the instantiation stream, a conflict log entry of an insert type of conflict may be created, thereby indicating that the operation in the apply stream is in conflict with the insertion stream of the instantiation stream. Similarly, if an operation in the apply stream is in conflict with a delete operation in the instantiation stream, a conflict log entry of a delete type of conflict may be created, thereby indicating that the operation in the apply stream is in conflict with the delete stream of the instantiation stream. If an operation in the apply stream is in conflict with an update operation in the instantiation stream, a conflict log entry of an insert type of conflict and a conflict log entry of a delete type of conflict may be created, thereby indicating that the operation in the apply stream is in conflict with both the insertion and the delete streams of the instantiation stream. This is so because the update operation in the instantiation stream may be decomposed into a combination of an insert in the insert stream and a delete in the delete stream, in the instantiation stream.

Where full supplemental logging (as will be further explained) is used for the apply stream for the duration of the instantiate process, and when the instantiate process processes the conflicting operation in its own stream that is in conflict with an operation in the apply stream, the instantiate process may perform a no-op. On the other hand, where full supplemental logging is disabled, or otherwise not used, when the instantiate process processes the conflicting operation in its own stream that is in conflict with an operation in the apply stream, the instantiate process may fill in values in fields of a conflicting row, where the values in the fields are not supposed to be provided by the operation in the apply stream.

To indicate that the conflicting operation in its insertion or delete stream has been processed, the instantiate process may clear the conflict log entry that was created earlier by the apply process.

The mechanism in various embodiments of the invention may be used regardless of the format and data structures used to store the user data. For example, the user data can reside in structures, in any form, such as SQL tables, object-relational tables, files, etc. The mechanism may also be used regardless of the types of user data stored such as basic data types, complex data types, opaque data types, a combination thereof, etc.

Example Conflicts

In an environment where data is shared among two or more databases, operations from a database A may be replicated or applied to a database B. The operations may occur at different databases or at different times in the same database. If two or more operations are made to the same row, then conflicts can occur.

Many different kinds of conflicts can occur for inserts, updates and deletes. For an insert, a uniqueness conflict can occur if the row already exists locally (i.e., a row with the same primary key is already in a local target table). For an update or delete, the row could exist, but have different values than the old values for the update or delete (i.e., the row has been modified locally in the meantime). Also, for an update or delete, the row could no longer exist (i.e., the row was deleted from the local table, or was never inserted). A delete can also run into a foreign key violation (i.e., a row in another table still references the row being deleted).

In various embodiments, automatic conflict resolution (logic) can be used to deal with various types of conflicts in various situations. For example, automatic conflict resolution can be used to resolve conflicts between two source databases both of which send its data change operations to a sink database. Similarly, automatic conflict resolution can be used to resolve conflicts between two databases both of which support native data change operations and an operation at one database is transferred to the other database, causing conflicts with different operations at the other database. Automatic conflict resolution can be used to detect dependency relationships among the operations and take appropriate compensating actions, including determining an appropriate precedence order, to apply them in a logically consistent way at a database that receives operations from another database. Ideally, any dependencies between operations/transactions at the source entity would also be observed when applying the operations/transactions at the sink entity. In some database systems, a user may be allowed to specify column groups for handling conflicts using different strategies. Specifically, the columns for a table can be partitioned into multiple column groups, and a different resolution method can be assigned to each column group. In these situations, automatic conflict resolution can be used to determine a different method of conflict resolution for each different column group.

Insert Where a Row Exists

Database B may receive an insert from database A. The conflict resolution logic may find that a row corresponding to a primary key specified in the insert already exists locally. For example, an error code may be returned from executing the insert at database B.

There are several alternative approaches any of which the conflict resolution logic may use to resolve this conflict (or handle this error returned from the insert).

Under an overwrite approach, the conflict resolution logic may change the insert received from database A to an update at database B (the old column values may be replaced by the new column values that are carried in the insert). As a result, the existing row data is overwritten at database B.

Under a discard approach, the conflict resolution logic may discard the insert received from database A.

Under a sequence number-based approach, a resolution column (res_col) is specified in the row and in data carried by the insert. Thus, the values of res_col for the insert received from database A and the current row at B are compared. In one embodiment, if the value of res_col from database A is higher than the current value at database B, then the insert will be converted to an update and applied at database B. Otherwise, if the value of res_col from database A is less than the current value at database B, the insert from A will be discarded, and the current values of the row will be kept.

In an alternative embodiment, if the value of res_col from database A is less than the current value at database B, then the insert will be converted to an update and applied at database B. Otherwise, if the value of res_col from database A is greater than the current value at database B, the insert from database A will be discarded, and the current values of the row will be kept.

Update Where a Row Has Been Modified

Database B may receive an update from database A. The conflict resolution logic may find that the row exists but has been modified in the meantime (i.e., the values of the update from A do not match the current values of the row at B).

Under the overwrite approach, the update will be applied at database B. As a result, values in one or more columns in the existing row are overwritten at database B.

Under the discard approach, the conflict resolution logic may discard the update received from database A.

Under the sequence number-based approach, a resolution column (res_col) is specified in the row and in data carried by the update. Thus, the values of res_col for the update received from database A and the current row at B are compared. In one embodiment, if the value of res_col from database A is higher than the current value at database B, then the update will be applied at database B. Otherwise, if the value of res_col from database A is less than the current value at database B, the update from A will be discarded, and the current values of the row will be kept.

In an alternative embodiment, if the value of res_col from database A is less than the current value at database B, then the update will be applied at database B. Otherwise, if the value of res_col from database A is greater than the current value at database B, the update from database A will be discarded, and the current values of the row will be kept.

Update Where a Row is Missing

Database B may receive an update from database A. The conflict resolution logic may find that a row that is supposed to be updated no longer exists at database B (for example, the row has been deleted in the meantime, or was never inserted).

Under the overwrite approach, the conflict resolution logic may change the update received from database A to an insert at database B. In some embodiments, a full set of row data that is equivalent to what is required for insert is carried in the update. As a result, a new row is created at database B.

Under the discard approach, the conflict resolution logic may discard the update received from database A.

Delete Where a Row is Missing

Database B may receive a delete from database A. The conflict resolution logic may find that a row that is supposed to be updated no longer exists at database B (for example, the row has been deleted in the meantime, or was never inserted). The conflict resolution logic may simply ignore this delete.

Delete Where a Row Has Been Modified

Database B may receive a delete from database A. The conflict resolution logic may find that the row exists but has been modified in the meantime (i.e., the row values carried in the delete—where full supplemental logging is enabled, for example, as will be further explained—from A do not match the current values of the row at B).

Under a delete approach, the delete will be applied at database B. As a result, the existing row is removed from database B.

Under the discard approach, the conflict resolution logic may discard the delete received from database A.

Delete Where a Foreign Key Constraint Would be Violated

Database B may receive a delete from database A. The conflict resolution logic may find that the delete would delete a row that is referenced by another table.

Under a delete-cascade approach, the delete will be performed with delete cascade at database B, so that any referencing rows will also be deleted.

Under the discard approach, the conflict resolution logic may discard the delete received from database A.

LOB Write to a Row that No Longer Exists

Database B may receive a large object block (LOB) write from database A. This LOB write intends to update a LOB field in an existing row in database B. However, the conflict resolution logic may find that that row does not exist in database B (for example, because of a missing insert or an intervening delete).

Under the discard approach, the conflict resolution logic may discard the LOB write received from database A.

In the foregoing discussion, the sequence number-based approach of conflict resolution has been described as based on a res_col column in the row data in the current row or in the operation. It should be noted that this is for illustration purposes only. For the purpose of this invention, other ways of specifying precedence may be used. For example, a timestamp may be used in place of the sequence number. Furthermore, this timestamp may be not be stored in the row data but may only be associated with the row data. In some situations, precedence between the operation and the current row may even be determined without explicit specification of any sequence number information in the row data. For example, an operation may be from a particular process, such as the instantiate process (which will be further explained). Another operation may be from another process, such as the apply process. Any row data created by the instantiate process may be considered as having a lower precedence than that carried by the operation in the apply process. Therefore, in these situations, information about a source where a particular operation is from may be used to determine precedence, thereby accomplishing the same effect as if the precedence has been explicitly set in row data or in an operation. These and other variations of determining a precedence order for an operation and an existing row (which may be created by a previously-applied operation) or a missing row are within the scope of the present invention.

Example System

FIG. 1A illustrates an example system 100 that comprises a source entity 102 and a sink entity 104, in accordance with an embodiment of this description.

For the purpose of this invention, the system (100) may be of any type. In an embodiment, for example, the system may be, but is not limited to, a distributed system that comprises multiple database systems. In such a distributed system, the source entity (102) may be a local database system while the sink entity (104) may be a remote database system.

For the purpose of illustration, data stored in a source database 106 of the source entity (102) is to be transferred to a sink database 108 of the sink entity (104). In some embodiments, the transferring of the data from the source database (106) to the sink database (108) is performed by a capture process 110, an apply process 112, and an instantiate process 114. Specifically, a particular time point may be established such that the instantiate process (114) is responsible for replicating the data from the source database (106) up to that particular time point while the capture process (110) and the apply process (112) are responsible for transferring data changes, which occur after that particular time point, from the source database (106) to the sink database (108).

In some embodiments, database objects that are created before the particular time point in the source database (106) are instantiated at the sink database (108) prior to incremental changes to these database objects that occur at the source entity being applied to the sink database (108). This is so because the apply stream and the instantiation stream may be asynchronously (i.e., in any time order) processed at the sink database. Here, a database object may refer to, but is not limited to, a SQL table, an index, etc. For example, the source database (106) may have a SQL table A. Incremental changes may occur to this table (A) in the source database (106) at the source entity (102). However, before these incremental changes can be applied to the sink database (108), the SQL table (A) needs to be instantiated at the sink entity (104) first. As used herein, the term "instantiate" means defining or creating, in the sink database (108) at the sink entity (104), a database object that corresponds to a database object (in this example, A) in the source database (106) at the source entity (102), as well as replicating, in the sink database (108) at the sink entity (104), any data manipulation operations in the source database (106) at the source entity (102).

In some embodiments, instantiation of database objects and replication of data change operations from the source entity to the sink entity is performed by the instantiate process (114). Therefore, all data changes at the source entity up to the particular time point are transferred by the instantiate process (114) using the instantiation stream. On the other hand, incremental changes at the source entity after the particular time point are captured by the capture process at the source entity and applied at the sink entity by the apply process using the apply stream.

Specifically, the capture process (110) may, but is not limited to, be deployed at the source entity (102) to mine information in one or more transaction logs 116 that record operations belonging to a stream of local transactions performed at the source entity (for the purpose of this invention, the capture process is not limited to mining transaction logs; in an alternative embodiment, for example, triggers can be used to cause changes to be captured synchronously). The information mined from the one or more transaction logs (116) may be provided (or transferred) by the capture process (110) to the apply process (112) deployed at the sink entity (104). The apply process (112) is a consumer process for the mined information and may be, but is not limited to, a data replication process, a data storing process, an application server process, etc. The apply process (112) may, but is not limited to, be deployed at the sink entity (104). Similarly, the instantiate process (114) may, but is not limited to, be deployed at the sink entity (104).

Example Transaction History

Figure 1B:
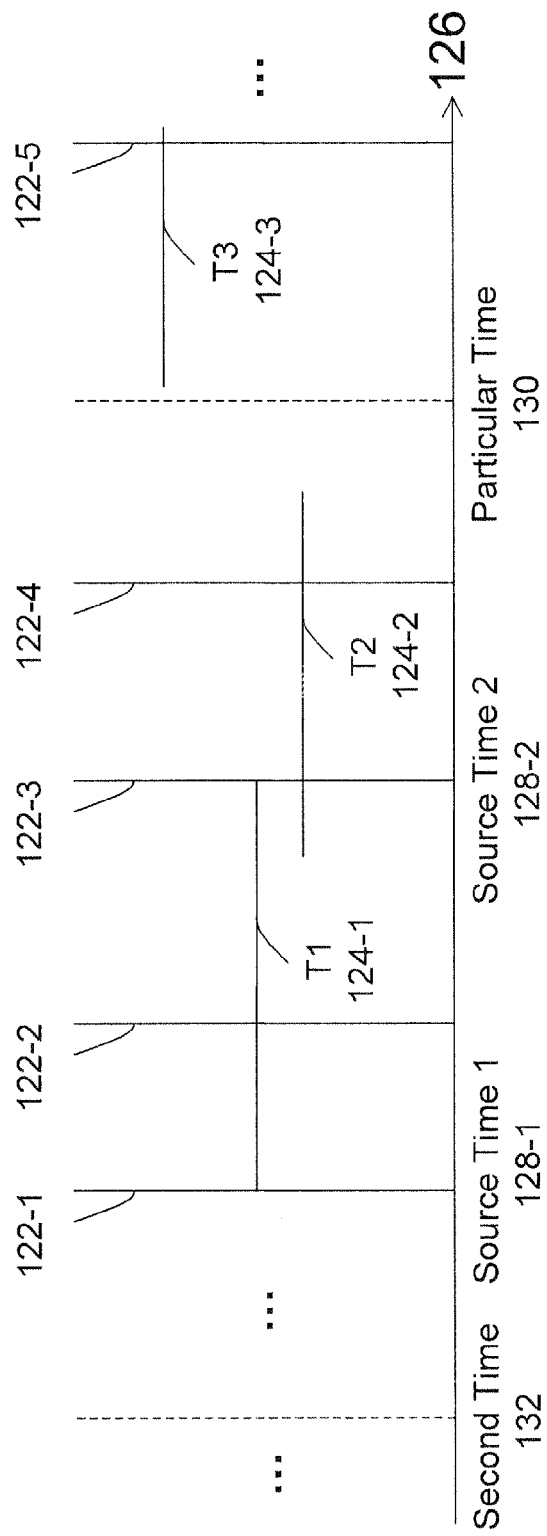
FIG. 1B is a diagram of an example transaction history that occurs at a source entity in accordance with an embodiment of the present invention.

FIG. 1B illustrates an example transaction history 120 at the source entity (102 of FIG. 1A), in accordance with some embodiments of this description. In an embodiment, transaction history 120 comprises a series of operations (122-1 through 5 as illustrated in FIG. 1B) that (continuously) occur at the source entity (102). These operations may be data definition operations such as creating/altering a table or creating an index, or data manipulation operations such as inserting, deleting, or updating data in a table. In some embodiments, the operations form a series of transactions (124-1 through 3 as illustrated in FIG. 1B). As used herein, the term "a transaction" refers to a set of correlated operations 122, which, for example, may be committed or roll-backed together. In a particular transaction, any such transaction 124 is bracketed by a start transaction operation in the beginning of the transaction and by an end transaction operation at the end of the transaction. An end transaction operation in a transaction 124 may be a "commit" operation that commits all the tentative data changes made by operations 122 in the transaction 124. Likewise, an end transaction operation in a transaction 124 may also be a "rollback" operation which cancels all the tentative data changes made by operations 122 in the transaction 124.

Here, the term "transaction history" refers to, but is not limited to, backup files, archives stored in various media at the source entity, transaction logs (such as 116 of FIG. 1A), redo logs, file system journals, etc., that keep sufficient information (for example, in the form of records) for transactions that have been processed at the source entity (102). In particular, information in the transaction history (120) may comprise a stream of records. Each of these records may comprise a type for an operation, identification information for a database object (for example, a SQL table) or data (for example, a row in the SQL table) contained therein that has been affected by the operation, and before and after images of data in the database object caused by the operation.

As illustrated in FIG. 1B, transactions 124 (or operations 122) are recorded in the transaction history 120 along a source time direction 126. As used herein, the term "source time" refers to times taken at the source entity as the operations (122) that are recorded in the transaction history (120) occur at the source entity (102). Therefore, it should be noted that source time 126 is not necessarily the (wall) time at which any of the capture process or the apply process or the instantiate process is running, but rather the time when an operation occurs at the source entity. Specifically, the term "source time" does not necessarily refer to (record reading) times at the source entity (102) when records are read out at the source entity (102) by the capture process (110 of FIG. 1A) or by the instantiate process (114 of FIG. 1A).

In some embodiments, a transaction 124 may comprise two or more operations 122. As a result, these operations (122) may not all occur at a single time point. Instead, the operations (122) may spread over a time period. For example, as illustrated in FIG. 1A, a transaction, T1 (122-1), occurs over a period from a source time 1 (128-1) to a source time 2 (128-2). Similarly, a transaction, T2 (122-2) occurs over a period from a time that is some time before source time 2 (128-2) to a source time 3 (128-3).

System Change Number

In some embodiments, each operation 122 in the transaction history (120) may be assigned its own unique identifier that is distinct among all operations 122 including those in the same transaction 124. In some other embodiments, each operation 122 in the transaction history (120) may be assigned a unique identifier that is distinct among all transactions 124. That is, a unique identifier is assigned to a transaction and to all operations therein. For the purpose of illustration, the term "unique identifier" refers to the fact that each operation 122 recorded in the transaction history (120) is assigned a different identifier (for example, a different numeric value).

In some embodiments, a unique identifier that is assigned to an operation 122 is a unique sequence number known as system change number. In particular, a new system change number is assigned at the time when a new operation 122 occurs along the source time direction (126). In some embodiments, a (valid) system change number is a positive (or unsigned) integer that ranges to very large numbers. In a particular embodiment, system change numbers are assigned in a round-robin manner. That is, once the highest ceiling number for system change numbers is reached, the next system change number is assigned from a number that is close to zero. Various algorithms may be employed in the processes of this description to recognize that a very small system change number may be a later-assigned (thus semantically a greater) number than a few system change numbers with very large numbers that are still being processed at the source entity (102).

System change numbers, in some embodiments, may be assigned to operations 122 in a sequentially and monotonically increasing order as these operations occur at the source entity (102) along source time 126.

In some embodiments, since both system change numbers (except when they are wrapped around when an very large upper limit such as $2^{32}$ or $2^{64}$ for the system change numbers is reached) and time values of source time 126 increase monotonically, a system change number may logically represent a point of time along source time 126 when the system change number is assigned.

Since the source entity (102) may have a number of transactions 124 concurrently being processed, such as T1 and T2 as illustrated in FIG. 1B, any of a consecutive block of system change numbers may be assigned to different transactions 124 in an interleaving manner with respect to transactions.

Instantiation Window

In accordance with an embodiment of the present invention, a particular time point (as mentioned previously) 130 along the source time (126) may be chosen to split operations into either the instantiation stream or the apply stream. Accordingly, all operations 122 that occur up to the particular time point (130) are to be (bulk) replicated to the sink entity (104) by the instantiate process (114) while all other operations 122 that occur after the particular time point (130) will be captured at the source entity (102) by the capture process (110) and applied at the sink entity (104).

In some embodiments, the particular time point corresponds to a system change number that is issued to a particular operation. This system change number may be called an instantiation SCN. Up to the particular operation that has the instantiation SCN, operations that occur at the source entity are handled by the instantiate process (114). These operations form an instantiation stream that flows from the source entity to the sink entity. Incremental changes (i.e., operations after the particular operation or after the instantiation SCN) at the source entity, however, will be captured and applied at the sink entity by the capture process (110) and the apply process (112) working in tandem. These incremental changes form an apply stream from the source entity to the sink entity. In some embodiments, a plurality of database objects that corresponds to those in the source database (106) may need to be created in the sink database (108)—i.e., an instance of database objects in the source database (106) is created in the sink database (108). In various embodiments, such instantiation may be performed by the instantiate process (114) or by some other entities. For example, various methods such as RMAN (commercially available from Oracle Corporation), export/import, transportable tablespaces, etc. may be used to create an instance of a part, or a whole, of the source database in the sink database. In a particular embodiment, the instantiate process (114) will create an instance of the source database based on operations in the transaction history (120) from the very beginning thereof, up to the particular time point (130) or SCN. Therefore, an instantiation window within which the instantiate process (114) captures operations in the transaction history (120) is from "−infinity" to the particular time point (130).

In some other embodiments, the instantiate process (114) only needs to replicate operations in the transaction history (120) from the second time point (132), up to the particular time point (130). As a result, the instantiation window in these embodiments is from the second time point (132) to the particular time point (130).

For the purpose of illustration, it has been described that all operations in the transaction history (120) are replicated from the source entity to the sink entity. It should be noted that this is for illustration only. For the purpose of the present invention, not all operations in the transaction (120) need to be transferred. For example, rules may be specified to include only certain types of database objects or certain types of data changes that are to be replicated. Thus, for the purpose of the present invention, all variations of including or excluding operations for replication purposes are within the scope of the present invention.

Apply Stream and Instantiation Stream

In accordance with an embodiment of the present invention, an automatic conflict resolution mechanism is implemented in a distributed database system such as the example system 100 to provide support for continuously applying incremental changes after a time point such as the particular time point (130 of FIG. 1B) while bulk instantiation for an instantiation window (up to that time point) may be asynchronously performed (e.g., by instantiate process 114 of FIG. 1A) between a source database (e.g., 106 of FIG. 1A) and a sink database (e.g., 108 of FIG. 1A). In various embodiments, the bulk instantiation may be performed, before, after, or at the same time as the incremental changes are applied at the sink entity. Therefore, upon completion of the instantiate process at the sink entity (104), the sink database (108) at the sink entity (104) will be in a "steady state" with the source entity (102). As used herein, the term "steady state" means that the target database (108) is updated up to whichever time point that corresponds to the latest operation being applied at the sink entity (104). In other words, all past operations before that time point have either been replicated or applied at the sink entity (104).

In some embodiments, the instantiation stream comprises of rows that need to be inserted or deleted to make the sink entity consistent with the source entity as of the instantiation SCN. If tables at the sink entity are initially empty, then the instantiation stream only comprises of an insert stream, which are rows that need to be inserted. If, on the other hand, the tables at the sink entity are not empty, then the instantiation stream comprises of a delete stream, which are rows that need to be deleted at the sink site, and an insert stream, which are rows that need to be inserted at the sink site. As a result, an operation (which, for example, manipulates a row) at the source entity, whether it is "insert", "delete", or "update", may be decomposed into a (row) insert stream and/or a (row) delete stream.

For instantiation, it is not necessary to send over all operations as they were done at a source database. In some embodiments, only those operations needed to modify data at the sink database to resemble the source database is sent to apply at the sink database (for example, operations are applied at the sink database to delete any rows at the sink database that are not at the source database, and insert any rows at the source database that are not at the sink database).

Foreign Key Constraints and Full Supplemental Logging

In some embodiments, foreign key constraints involving tables that are being replicated are disabled at the sink entity (104) for the duration of the instantiate process (114).

In some embodiments, there is full supplemental logging on the tables being instantiated for the duration of the instantiation, starting from the instantiation SCN. With the full supplemental logging, a record in the apply stream that records an operation occurring at the source entity comprises a full set of row data for a row affected by the operation. Thus, even if the operation is an update operation that only updates a few columns in the row, all values in the row will be included in the corresponding record in the apply stream, under the full supplemental logging.

Automatic Conflict Resolution

As noted above, some operations in the apply stream may depend on some other operations in the instantiation stream, because the former operations occurred later than the latter operations along the source time direction (126) at the source entity (102). As a result, absent an effective way to resolve conflicts, the apply process (112) may not be able to apply an incremental change in the apply stream for a row, if that row has not been instantiated by the instantiate process (114) in the instantiation stream. For example, the apply process (112) may not be able to update a row if the instantiate process (114) has not yet inserted the row, etc.

Figure 2:
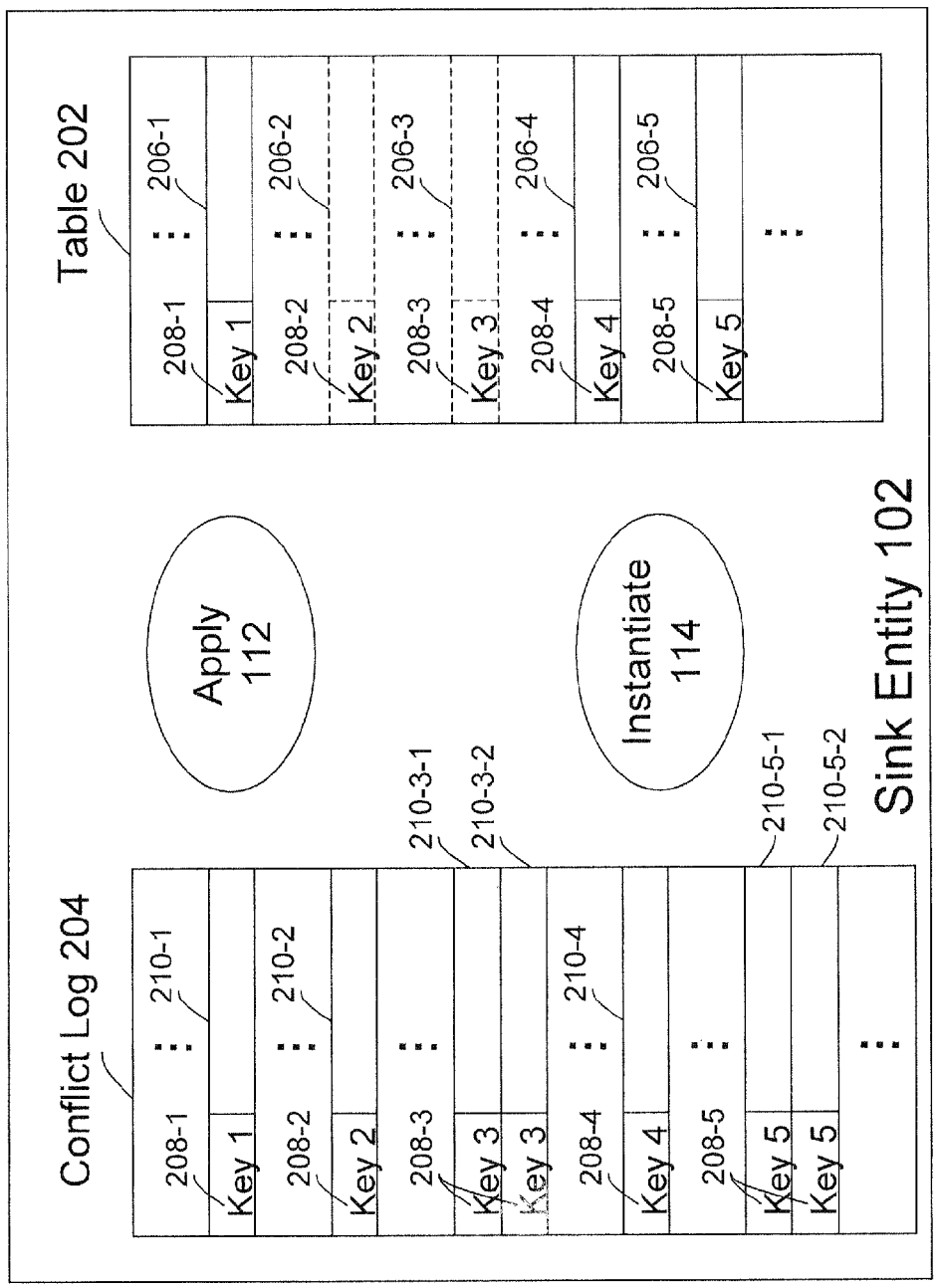
FIG. 2 is a diagram of example sink entity that automatically resolves conflict between operations from an apply stream and operations from an instantiation stream, in accordance with an embodiment of the present invention.

FIG. 2 illustrates an example sink entity that automatically resolves conflicts between operations in the apply stream and operations in the instantiation stream, in accordance with an embodiment of the present invention. In some embodiments, the apply process (112) implements an error handler. Where there is no conflict between the apply stream and the instantiation stream, the apply process (112) applies incremental changes in the apply stream without invoking the error handler. This may happen, for example, when an operation in the instantiation stream, which acts on a row in a table, is transferred and performed at the sink entity before another operation the apply stream that acts on the same row. On the other hand, if there is a conflict with the instantiating stream, then an error will be returned and detected by the apply process. This may happen, for example, when an operation in the instantiation stream, which acts on a row in a table, is transferred and performed at the sink entity after another operation in the apply stream that acts on the same row.

Insert-Delete Conflict

As an example of the above-described conflict, an insert operation in the apply stream may return a "duplicate row" error, indicating a conflict between this insert operation and a deletion operation in the instantiation stream that has yet to be replicated at the sink entity. For the purpose of illustration, the insertion and the deletion involve a row, say 206-1, in a table 202 as illustrated in FIG. 2. Furthermore, this row has a primary key 208-1 that logically identifies the location of the row (206-1) in the table (202).

To handle this conflict, the apply process (112) invokes the error handler to log the missing deletion as a conflict entry, say 210-1, in a conflict log 204. To compensate for the missing deletion, the apply process (112) converts the insertion into an update. In some embodiments, the conflict entry that is logged by the apply process in this case is marked as a delete type of conflict.

When the deletion in the instantiation stream (or, more specifically, in a delete stream if the instantiation stream is viewed as a combination of the delete stream and an insert stream, as previously described) arrives afterwards at the sink entity, the instantiate process (114) looks up the conflict log using the key (208-1) to see if there is a conflict entry 210 (of a delete type of conflict) that matches the key. In some embodiments, the key may be extracted by the instantiate process (114) from the deletion operation (or from a corresponding record in the instantiation stream).

In response to determining that there is a conflict entry (i.e., 210-1) that matches the key (208-1), the instantiate process (114) skips the deletion of this row (206-1), and removes the conflict entry (210-1) from the conflict log(204).

Delete-Insert Conflict

As another example of conflict between the apply process and the instantiate process, a delete operation in the apply stream may return a "missing row" error, indicating a conflict between this delete operation and an earlier insertion operation in the instantiation stream that has yet to be replicated at the sink entity. For the purpose of illustration, both operations involve a row, say 206-2, in the table 202 as illustrated in FIG. 2. Furthermore, this row has a primary key 208-2 that logically identifies the location of the row (206-2) in the table (202).

To handle this conflict, the apply process (112) invokes the error handler to log the missing insertion as a conflict entry, say 210-2, in the conflict log 204. To compensate for the missing insertion, the apply process (112) skips the deletion. In some embodiments, the conflict entry that is logged by the apply process in this case is marked as an insert type of conflict.

When the insertion in the instantiation stream (or, more specifically, in the insert stream if the instantiation stream is viewed as a combination of the delete stream and the insert stream, as previously described) arrives afterwards at the sink entity, the instantiate process (114) looks up the conflict log using the key (208-2) to see if there is a conflict entry 210 (of an insert type of conflict, since this operation is an insert) that matches the key. As before, the key may be extracted by the instantiate process (114) from the insertion operation (or from a corresponding record in the instantiation stream).

In response to determining that there is a conflict entry (i.e., 210-2) that matches the key (208-2), the instantiate process (114) skips the insertion of this row (206-2), and removes the conflict entry (210-2) from the conflict log (204).

For the purpose of illustration, the row 206-2 has been illustrated in the table 202 in FIG. 2, where it should have existed had the insertion in the instantiation stream preceded the deletion in the apply stream. It should be noted that this is for explanation purposes only. This row 206-2 may actually only exist in a table of the source database (106) corresponding to the table 202.

Delete-Update Conflict

As a further example of conflict between the apply process and the instantiate process, a delete operation in the apply stream may not return a "missing row" error, as described above. Instead, the apply process (112) may discover that a row to be deleted may comprise different values in the table 202 than values in information carried in the delete operation in the apply stream, thereby indicating a conflict between this delete operation and an earlier update operation (which may be regarded as a delete followed by an insert) in the instantiation stream that has yet to be replicated at the sink entity. For the purpose of illustration, this row has a primary key 208-3 that logically identifies the location of the row (206-3) in the table (202).

To handle this conflict, the apply process (112) invokes the error handler to log the missing update as two conflict entries, say 210-3-1 and 210-3-2, in the conflict log 204. The apply process (112) carries out the deletion. In some embodiments, one of the conflict entries, say 210-3-1 is marked as a delete type of conflict and the other of the conflicting entries, say 210-3-2 is marked as an insert type of conflict.

In some embodiments, the update in the instantiation stream is decomposed into two operations: a delete in the delete stream of the instantiation stream and an insert in the insert stream of the instantiation stream. In some embodiments, the instantiate process ensures that the delete occurs logically before the insert. This logical ordering could be implemented either physically or using additional bookkeeping. Accordingly, when the delete in the delete stream arrives at the sink entity, the instantiate process (114) looks up the conflict log using the key (208-3) to see if there is a conflict entry 210 (of a delete type of conflict, since this operation is a delete) that matches the key. As before, the key may be extracted by the instantiate process (114) from the delete operation (or from a corresponding record in the instantiation stream).

In response to determining that there is a conflict entry (i.e., 210-3-1) that matches the key (208-3) and the type of conflict, the instantiate process (114) skips the deletion of this row (206-3), and removes the conflict entry (210-3-1) from the conflict log (204).

Similarly, when the insert in the insert stream arrives afterwards at the sink entity, the instantiate process (114) looks up the conflict log using the key (208-3) to see if there is a conflict entry 210 (of an insert type of conflict, since this operation is an insert) that matches the key.

In response to determining that there is a conflict entry (i.e., 210-3-2; of an insert type of conflict) that matches the key (208-3) and the type of conflict, the instantiate process (114) skips the insertion of this row (206-3), and removes the conflict entry (210-3-2) from the conflict log (204).

Update-Insert Conflict

An update operation in the apply stream may also return a "missing row" error, indicating a conflict between this update operation and an earlier insertion operation in the instantiation stream that has yet to be replicated at the sink entity. For the purpose of illustration, these operations involve a row, say 206-4, in the table 202 as illustrated in FIG. 2. Furthermore, this row has a primary key 208-4 that logically identifies the location of the row (206-4) in the table (202).

To handle this conflict, the apply process (112) invokes the error handler to log the missing insertion as a conflict entry, say 210-4, in the conflict log 204. To compensate for the missing insertion, the apply process (112) converts the update to an insertion. In some embodiments, default values for non-update fields in the row (206-4) may be used. In some other embodiments, values for non-update fields in the row (206-4) are provided by the full supplemental logging.

When the insertion in the instantiation stream arrives afterwards at the sink entity, the instantiate process (114) looks up the conflict log using the key (208-4) to see if there is a conflict entry 210 (of an insert type of conflict, since this operation is an insert) that matches the key. As before, the key may be extracted by the instantiate process (114) from the insertion operation (or from a corresponding record in the instantiation stream).

In response to determining that there is a conflict entry (i.e., 210-4) that matches the key (208-4), in some embodiments, the instantiate process (114) converts the insertion of this row (206-4) to an update operation that updates all the non-update fields in the row (206-4). Here, the "non-update fields" in the row (264-4) are the fields that were not supposed to be updated by the update in the apply stream. However, as previously described, these non-update fields may now comprise default values. In a particular embodiment, the conflict entry (210-4) may contain information (such as bit vectors) to identify which fields are not updated by the update operation in the apply stream. In these embodiments where default values were used, the instantiate process (114) uses a converted update with correct values for the non-update fields to update the row (206-4).

In the embodiments where the full supplemental logging is enabled and values from such logging are used in the update operation in the apply stream, the instantiate process (114) may skip the insertion operation.

Regardless of whether the instantiate process (114) skips the insert in the insert stream or converts the insert into an update, the instantiate process (114) removes the conflict entry (210-4) from the conflict log (204).

Update-Update Conflict

An update operation in the apply stream may not return a "missing row" error, as described above. Instead, the apply process (112) may discover that a row to be updated may comprise different values in the table 202 than old values in information carried in the update operation in the apply stream, thereby indicating a conflict between this update operation in the apply stream and an earlier update operation in the instantiation stream that has yet to be replicated at the sink entity. For the purpose of illustration, this row has a primary key 208-5 that logically identifies the location of the row (206-5) in the table (202).

To handle this conflict, the apply process (112) invokes the error handler to log the missing update as two conflict entries, say 210-5-1 and 210-5-2, in the conflict log 204. The apply process (112) carries out the update. In some embodiments, default values for non-update fields in the row (206-5) may be used. In some other embodiments, values for non-update fields in the row (206-5) are provided by information (carried by the update operation in the apply stream) from the full supplemental logging.

In some embodiments, the update in the instantiation stream is decomposed into two operations: a delete in the delete stream of the instantiation stream and an insert in the insert stream of the instantiation stream. Accordingly, when the delete in the delete stream arrives afterwards at the sink entity, the instantiate process (114) looks up the conflict log using the key (208-5) to see if there is a conflict entry 210 (of a delete type of conflict, since this operation is a delete) that matches the key. As before, the key may be extracted by the instantiate process (114) from the deletion operation (or from a corresponding record in the instantiation stream).

In response to determining that there is a conflict entry (i.e., 210-5-1) that matches the key (208-5) and the type of conflict, the instantiate process (114) skips the deletion of this row (206-5), and removes the conflict entry (210-5-1) from the conflict log (204).

Similarly, when the insert in the insert stream arrives afterwards at the sink entity, the instantiate process (114) looks up the conflict log using the key (208-5) to see if there is a conflict entry 210 (of an insert type of conflict, since this operation is an insert) that matches the key.

In response to determining that there is a conflict entry (i.e., 210-5-2) that matches the key (208-5) and the insert type of conflict, in some embodiments, the instantiate process (114) converts the insertion in the insert stream to an update operation that updates all the non-update fields in the row (206-5). Here, the "non-update fields" in the row (206-5) are the fields that were not supposed to be updated by the update in the apply stream. However, as previously described, these non-update fields may now comprise default values. In a particular embodiment, the conflict entry (210-5-2) may contain information (such as bit vectors) to identify which fields are not updated by the update operation in the apply stream. In these embodiments where default values were used, the instantiate process (114) uses a converted update with correct values for the non-update fields to update the row (206-5).

In the embodiments where the full supplemental logging is enabled and values from such logging are used in the update operation in the apply stream, the instantiate process (114) may skip the insertion operation.

Regardless of whether the instantiate process (114) skips the insert in the insert stream or converts the insert into an update, the instantiate process (114) removes the conflict entry (210-5-2) from the conflict log (204).

No Conflict

Regardless of whether an operation is an insertion in the insert stream or a deletion in the delete stream, the instantiate process (114) may check to see if there is a conflict entry 210 (of a corresponding type of conflict) that is associated with a primary key that is extracted from the operation. In response to determining that there is no conflict entry 210 that matches the key (208-5) and the corresponding type of conflict, the instantiate process (114) may proceed to carry out the operation at the sink entity. Thus, if the operation is a (row) insert, the instantiate process inserts a row in the sink database. Similarly, it the operation is a (row) delete, the instantiate process deletes a row in the sink database.

At the end of the instantiate process (114), i.e., when it reaches the particular time point (130), in the absence of other unrelated errors, there should be no unresolved conflicts. In other words, the conflict log 204 is empty.

In some embodiments, one or more operations in the apply stream or in the instantiation stream may be grouped into a transaction that is created at the sink entity (104). Such a transaction may or may not be the same as a transaction that has occurred at the source entity (102).

Example Concurrency Control

In some embodiments, efficient concurrency control is implemented to coordinate operations between the instantiate process (114) and the apply process (112). This is to ensure that the instantiate process and the apply process do not process the same row simultaneously. For example, a locking mechanism may be used such that access to the conflict log for the same primary key in the same table is limited to only one of the processes at any given time, thereby precluding the other until a row that corresponds to an entry in the conflict log for the same primary key is finished processing by the process that holds a lock.

Sample Operation

Figure 3A:
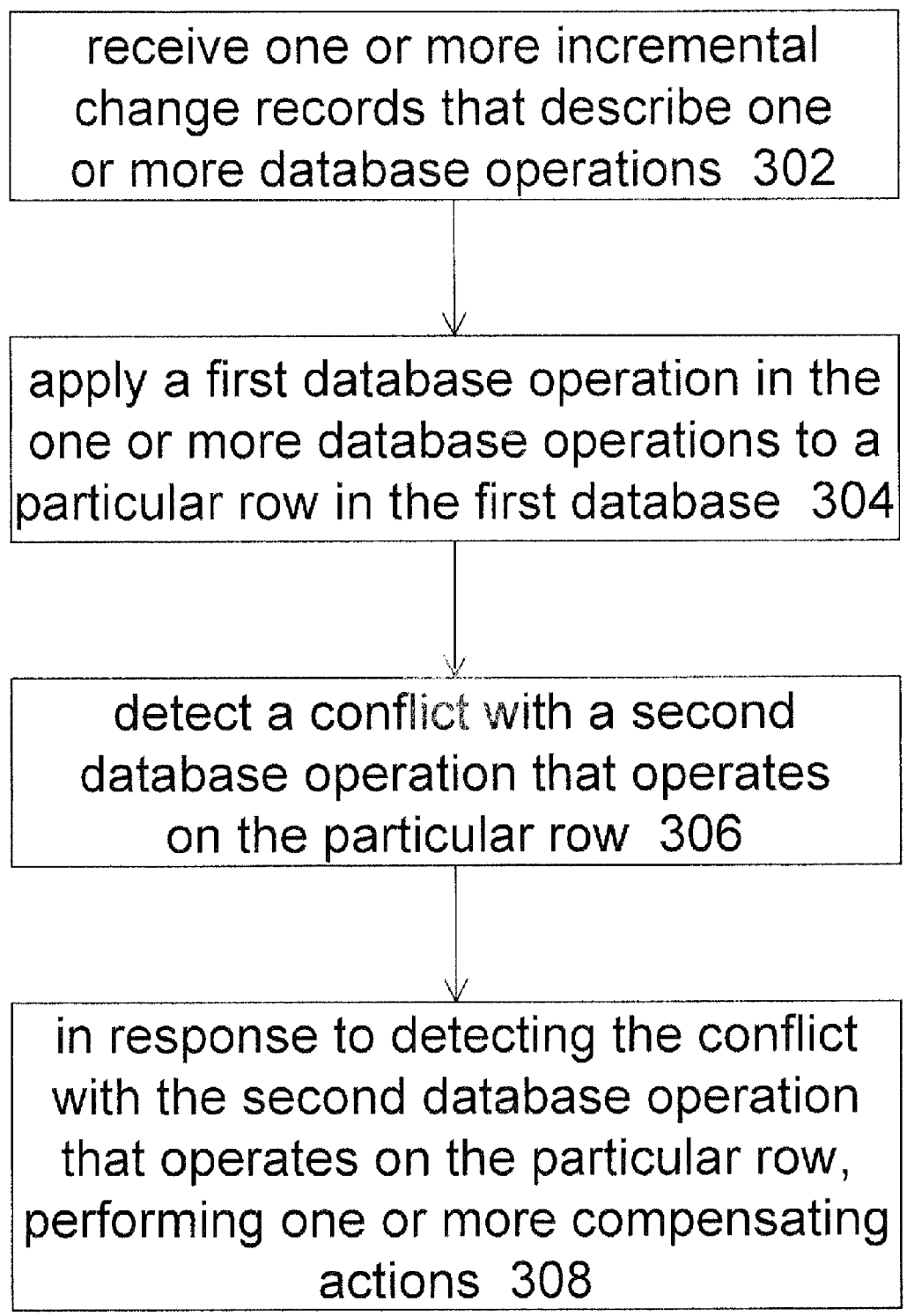
FIG. 3A and FIG. 3B are example flow diagrams, according to embodiments of the present invention.

FIG. 3A shows an example process flow for applying data changes to a first database (which may be, for example, the sink database 108 of FIG. 1A) at an entity such as the sink entity of FIG. 1A, according to an embodiment of the invention. In some embodiments, a process such as the apply process (112 of FIG. 1A) implements the example process flow.

Initially, in block 302, the apply process (112) receives one or more incremental change records that describe one or more database operations. Here, all of the one or more database operations have occurred in a second database (which may be, for example, the source database 106 of FIG. 1A) after a particular time. This particular time may be represented by an instantiation system change number that is assigned to a database operation in the second database. In some embodiments, the one or more incremental change records are captured from a transaction history that is associated with the second database. In a particular embodiment, the one or more incremental change records are received in an apply stream. In some embodiments where full supplemental logging is turned on for the apply stream for the duration of the instantiate process (114 of FIG. 1A), at least one of the one or more incremental change records that describe the first database operation comprise a full set of values for the particular row.

In block 304, the apply process applies a first database operation in the one or more database operations to a particular row in the first database.

In block 306, the apply process detects a conflict with a second database operation that operates on the particular row. Here, the second database operation has occurred in the second database prior to the particular time. The conflict may be due to the fact that the second database operation has not occurred in the first database before the first database operation in the first database. In other words, these database operations may be executed out of the order in the sink entity, since the apply process and the instantiate process now may run in any order, thereby resulting in the conflict.

The particular conflict's type is determined by a combination of the first operation type and the second operation type. Here, the first database operation is of the first operation type, while the second database operation is of the second operation type. For example, the first database operation may be of an insert type while the second database operation may be of a delete type. Therefore, the conflict may be of an insert-delete conflict type.

In block 308, in response to detecting the conflict with the second database operation that operates on the particular row, the apply process performs one or more compensating actions. Here, the one or more compensating actions depend on the particular conflict type. In some embodiments, the one or more compensating actions include performance of zero or more database operations on the particular row in the first database. In some embodiments, at least one of the one or more compensating actions is an action that stores an indication in a conflict log, wherein the indication indicates that the first database operation has occurred in the first database. For example, where the conflict is an insert-delete conflict, the compensating actions may be that, instead of applying an insert in the apply stream, the insert may be converted to an update, and that a conflict log entry 210 may be created to signal to the instantiate process that a semantically later insertion in the apply stream has been applied.

Figure 3B:
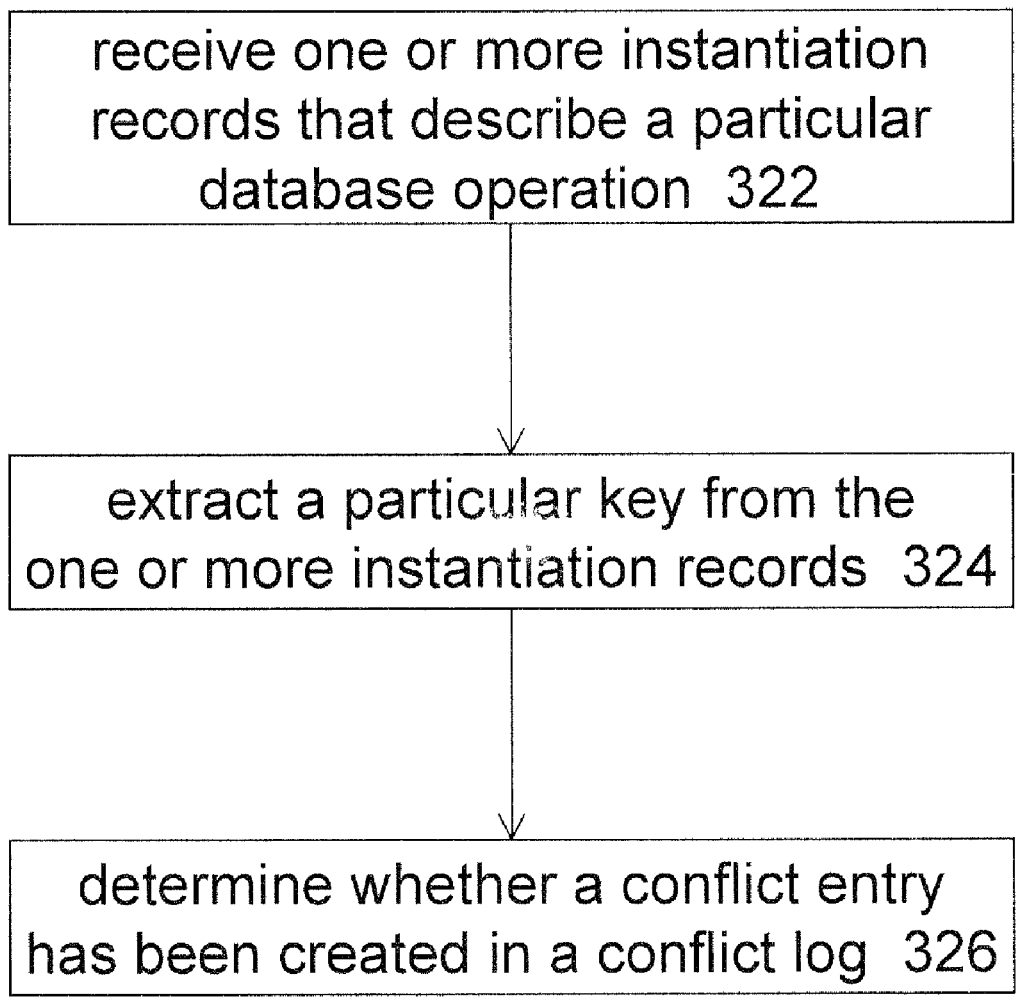

FIG. 3B shows another example process flow for instantiating data changes to a first database (which may be, for example, the sink database 108 of FIG. 1A) at an entity such as the sink entity of FIG. 1A, according to an embodiment of the invention. In some embodiments, a process such as the instantiate process (114 of FIG. 1A) implements this example process flow.

Initially, in block 322, the instantiate process (112) receives one or more instantiation records that describe a particular database operation. Here, the particular database operation has occurred in a second database before the particular time (or the instantiation SCN in some embodiments). In some embodiments, the one or more instantiation records are received in an instantiation stream. Furthermore, the one or more instantiation records may be captured from a transaction history that is associated with the second database. In some embodiments, various methods such as RMAN, export/import, transportable tablespaces, etc. may be used, instead of mining data in transaction a history, to create an instance of a part, or a whole, of the source database in the sink database.

In block 324, the instantiate process (112) extracts a particular key from the one or more instantiation records. In some embodiments, the particular key is a primary key (208 of FIG. 2) for a row (206 of FIG. 2) in a table (such as 202 of FIG. 2).

In block 326, the instantiate process (112) determines whether a conflict entry (210 of FIG. 2) has been created in a conflict log (such as 204 of FIG. 2). Here, the conflict entry comprises a field that match the particular key. Furthermore, the conflict entry indicates a second database operation has been applied at the first database, which has occurred in the second database after the particular time. For example, where the conflict entry corresponds to an insert-delete entry, an insert after the particular time in the source database (106 of FIG. 1) may have already been applied in the sink database (108 of FIG. 1) prior to an delete that occurs before the particular time in the source database (106 of FIG. 1).

Hardware Overview

Figure 4:
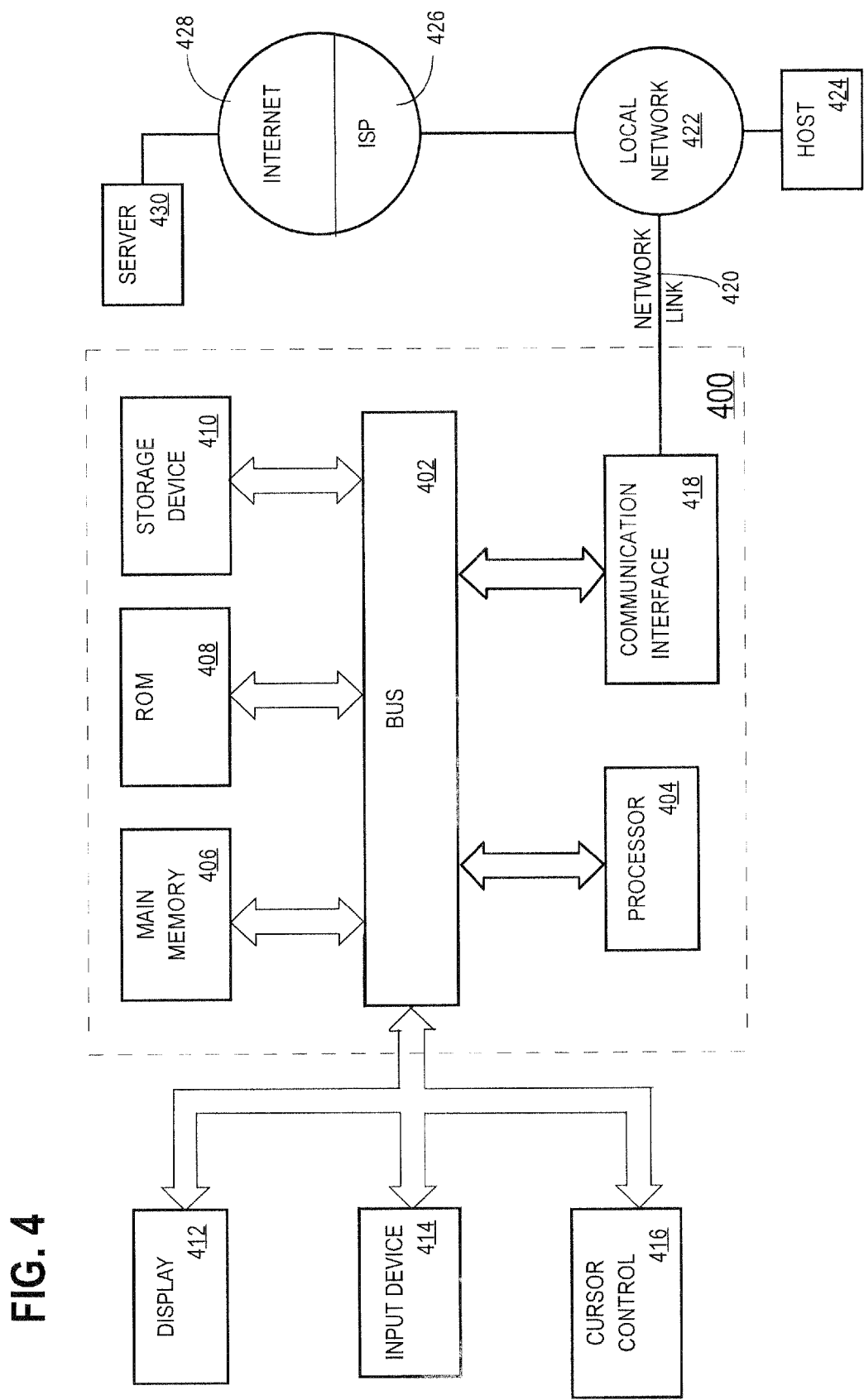
FIG. 4 is a block diagram of a system upon which the techniques described herein may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for applying changes to a first database, comprising:
receiving one or more incremental change records that describe one or more database operations, wherein all of the one or more database operations have occurred in a second database after a particular time;
applying a first database operation in the one or more database operations to a particular row in the first database;
detecting a conflict with a second database operation that operates on the particular row, wherein the second database operation has occurred in the second database prior to the particular time, and wherein the conflict is of a particular conflict type; and
in response to detecting the conflict with the second database operation that operates on the particular row, performing one or more compensating actions, wherein the one or more compensating actions depend on the particular conflict type;
wherein the method is performed by one or more computing devices.

2. The method of claim 1, wherein at least one of the one or more compensating actions is an action that stores an indication in a conflict log, wherein the indication indicates that the first database operation has occurred in the first database.

3. The method of claim 1, wherein the particular conflict type is determined by a combination of a first operation type and a second operation type, wherein the first database operation is of the first operation type and wherein the second database operation is of the second operation type.

4. The method of claim 1, wherein the one or more compensating actions include performance of zero or more database operations on the particular row in the first database.

5. The method of claim 1, wherein the one or more incremental change records are captured from a transaction history that is associated with the second database.

6. The method of claim 1, wherein the particular time is represented by an instantiation system change number that is assigned to a database operation in the second database.

7. The method of claim 1, wherein the conflict is that the second database operation has not occurred in the first database before the first database operation in the first database.

8. The method of claim 1, wherein at least one of the one or more incremental change records that describe the first database operation comprises a full set of values for the particular row.

9. The method of claim 1, wherein the one or more incremental change records are received in an apply stream.

10. A method for instantiating a first database, comprising:
receiving one or more instantiation records that describe a particular database operation, wherein the particular database operation has occurred in a second database before a particular time;
extracting a particular key from the one or more instantiation records; and
determining whether a conflict entry has been created in a conflict log, wherein the conflict entry comprises a field that matches the particular key, wherein the conflict entry indicates that a second database operation has been applied at the first database, and wherein the second database operation has occurred in the second database after the particular time;
wherein the method is performed by one or more computing devices.

11. The method of claim 10, wherein the one or more instantiation records are received in an instantiation stream.

12. The method of claim 10, wherein the particular time is represented by an instantiation system change number that is assigned to a database operation in the second database.

13. The method of claim 10, wherein the one or more instantiation records are captured from a transaction history that is associated with the second database.

14. A computer-readable storage medium carrying one or more sequences of instructions which, when executed by one or more processors, causes the one or more processors to perform:
receiving one or more incremental change records that describe one or more database operations, wherein all of the one or more database operations have occurred in a second database after a particular time;
applying a first database operation in the one or more database operations to a particular row in the first database;
detecting a conflict with a second database operation that operates on the particular row, wherein the second database operation has occurred in the second database prior to the particular time, and wherein the conflict is of a particular conflict type; and in response to detecting the conflict with the second database operation that operates on the particular row, performing one or more compensating actions, wherein the one or more compensating actions depend on the particular conflict type.

15. The computer-readable storage medium of claim 14, wherein at least one of the one or more compensating actions is an action that stores an indication in a conflict log, wherein the indication indicates that the first database operation has occurred in the first database.

16. The computer-readable storage medium of claim 14, wherein the particular conflict type is determined by a combination of a first operation type and a second operation type, wherein the first database operation is of the first operation type and wherein the second database operation is of the second operation type.

17. The computer-readable storage medium of claim 14, wherein the one or more compensating actions include performance of zero or more database operations on the particular row in the first database.

18. The computer-readable storage medium of claim 14, wherein the one or more incremental change records are captured from a transaction history that is associated with the second database.

19. The computer-readable storage medium of claim 14, wherein the particular time is represented by an instantiation system change number that is assigned to a database operation in the second database.

20. The computer-readable storage medium of claim 14, wherein the conflict is that the second database operation has not occurred in the first database before the first database operation in the first database.

21. The computer-readable storage medium of claim 14, wherein at least one of the one or more incremental change records that describe the first database operation comprises a full set of values for the particular row.

22. The computer-readable storage medium of claim 14, wherein the one or more incremental change records are received in an apply stream.

23. A computer-readable storage medium carrying one or more sequences of instructions which, when executed by one or more processors, causes the one or more processors to perform:

receiving one or more instantiation records that describe a particular database operation, wherein the particular database operation has occurred in a second database before a particular time;

extracting a particular key from the one or more instantiation records; and determining whether a conflict entry has been created in a conflict log, wherein the conflict entry comprises a field that matches the particular key, wherein the conflict entry indicates that a second database operation has been applied at the first database, and wherein the second database operation has occurred in the second database after the particular time.

24. The computer-readable storage medium of claim 23, wherein the one or more instantiation records are received in an instantiation stream.

25. The computer-readable storage medium of claim 23, wherein the particular time is represented by an instantiation system change number that is assigned to a database operation in the second database.

26. The computer-readable storage medium of claim 23, wherein the one or more instantiation records are captured from a transaction history that is associated with the second database.

27. A method for applying changes to a first database, comprising:

creating a replica of one or more data objects of a second database in the first database using one or more instantiate operations, wherein the replica is updated to a particular time at the second database;

before finishing creating the replica of the one or more data objects of the second database in the first database, applying one or more incremental data change operations to the first database, wherein all of the one or more incremental data changes have occurred in the second database after the particular time; and resolving one or more conflicts between the one or more instantiate operations and the one or more incremental data change operations;

wherein the method is performed by one or more computing devices.

28. The method of claim 27, wherein the particular time is represented by an instantiation system change number that is assigned to a database operation in the second database.

29. The method of claim 27, wherein at least one of the one or more incremental data change operations is described in a record that comprises a full set of values for a particular row.

30. A computer-readable storage medium carrying one or more sequences of instructions which, when executed by one or more processors, causes the one or more processors to perform:

creating a replica of one or more data objects of a second database in the first database using one or more instantiate operations, wherein the replica is updated to a particular time at the second database;

before finishing creating the replica of the one or more data objects of the second database in the first database, applying one or more incremental data change operations to the first database, wherein all of the one or more incremental data changes have occurred in the second database after the particular time; and resolving one or more conflicts between the one or more instantiate operations and the one or more incremental data change operations;

wherein the method is performed by one or more computing devices.

31. The computer-readable storage medium of claim 30, wherein the particular time is represented by an instantiation system change number that is assigned to a database operation in the second database.

32. The computer-readable storage medium of claim 27, wherein at least one of the one or more incremental data change operations is described in a record that comprises a full set of values for a particular row.

* * * * *